United States Patent
Yoshimura et al.

(10) Patent No.: US 10,295,192 B2
(45) Date of Patent: May 21, 2019

(54) COOKER

(71) Applicants: Kiyomi Yoshimura, Kurume (JP);
Mitsuko Yoshimura, Kurume (JP);
Tsutomu Kano, Fujimi (JP); Yukio Hirose, Kanazawa (JP)

(72) Inventors: Kiyomi Yoshimura, Kurume (JP);
Mitsuko Yoshimura, Kurume (JP);
Tsutomu Kano, Fujimi (JP); Yukio Hirose, Kanazawa (JP)

(*) Notice: Subject to any disclaimer, the term of this patent is extended or adjusted under 35 U.S.C. 154(b) by 0 days.

(21) Appl. No.: 15/924,864

(22) Filed: Mar. 19, 2018

(65) Prior Publication Data
US 2018/0209655 A1    Jul. 26, 2018

Related U.S. Application Data

(63) Continuation of application No. PCT/JP2016/077052, filed on Sep. 14, 2016.

(30) Foreign Application Priority Data

Sep. 24, 2015    (JP) .................... 2015-186714

(51) Int. Cl.
*F24C 1/00*    (2006.01)
*F24C 7/04*    (2006.01)
(Continued)

(52) U.S. Cl.
CPC ............... *F24C 1/00* (2013.01); *A21B 3/04* (2013.01); *F24C 7/04* (2013.01); *F24C 7/06* (2013.01);
(Continued)

(58) Field of Classification Search
CPC .... F24C 15/325; F24C 15/003; F24C 15/006; F24C 15/02; F24C 15/025; F24C 15/327;
(Continued)

(56) References Cited

U.S. PATENT DOCUMENTS 7,353,821 B2    4/2008   Saksena
8,614,408 B2 *  12/2013  Kamii ................... F24C 15/325
                                                           126/21 A
(Continued)

FOREIGN PATENT DOCUMENTS

JP    2014-206377 A1    10/2014
JP    2014-228202 A1    12/2014
JP    2015-077265 A1    4/2015

OTHER PUBLICATIONS

International Search Report and Written Opinion (Application No. PCT/JP2016/077052) dated Dec. 6, 2016.
(Continued)

*Primary Examiner* — Shawntina T Fuqua
(74) *Attorney, Agent, or Firm* — Burr & Brown, PLLC

(57) ABSTRACT

The present invention provides a cooker including a cooking chamber having an opening, a door for opening and closing the opening, heaters provided in an upper portion and a lower portion of the cooking chamber, a superheated steam generator that supplies superheated steam into the cooking chamber, and a water spraying section that sprays water into the cooking chamber. A reducing state is established in the cooking chamber.

3 Claims, 3 Drawing Sheets

(51) Int. Cl.
  *F24C 15/20* (2006.01)
  *F24C 15/32* (2006.01)
  *A21B 3/04* (2006.01)
  *H05B 6/64* (2006.01)
  *F24C 7/06* (2006.01)

(52) U.S. Cl.
  CPC .......... *F24C 15/20* (2013.01); *F24C 15/2007* (2013.01); *F24C 15/327* (2013.01); *H05B 6/6479* (2013.01)

(58) Field of Classification Search
  CPC .. F24C 15/20; F24C 7/043; F24C 7/04; F24C 7/06; F24C 1/00; F22B 1/00; F22B 1/003; F22G 1/00; F22G 1/005; A21B 1/24; A21B 1/22; A21B 3/04
  See application file for complete search history.

(56) References Cited

U.S. PATENT DOCUMENTS

2008/0105138 A1    5/2008  Segato
2012/0298655 A1   11/2012  Kamii et al.

OTHER PUBLICATIONS

Extended European Search Report, European Application No. 168485423, dated Mar. 14, 2019 (8 pages).

\* cited by examiner

COOKER

CROSS REFERENCE TO RELATED APPLICATION

This application is a continuation of International Patent Application No. PCT/JP2016/077052, having an international filing date of Sep. 14, 2016, which designated the United States, the entirety of which is incorporated herein by reference. Japanese Patent Application No. 2015-186714 filed on Sep. 24, 2015 is also incorporated herein by reference in its entirety.

BACKGROUND OF THE INVENTION

The present invention relates to a cooker used for heat-based cooking.

For example, JP-A-2014-206377 discloses a heating cooker used for heat-based cooking using superheated steam.

Such a conventional cooker using superheated steam simply superheats steam, obtained by heating water, with a heater or the like, while the steam is being input to a cooking chamber, resulting in an oxidizing state in the cooking chamber.

The heat-based cooking in the oxidizing state results in oxidized food with less nutrients and more malodor.

The present invention is an improved version of a cooker using superheated steam (JP-A-2014-228202) that has been proposed by the inventors of the present invention.

An object of the present invention is to provide a cooker that is less likely to lose nutrients in food and leave malodor, and also features excellent preserving performance.

SUMMARY OF THE INVENTION

According to one aspect of the invention, there is provided a cooker comprising:

a cooking chamber having an opening;

a door opening and closing the opening;

heaters provided in an upper portion and a lower portion of the cooking chamber;

a superheated steam generator supplying superheated steam into the cooking chamber; and a water spraying section spraying water into the cooking chamber, a reducing state being established in the cooking chamber.

A conventional cooker using superheated steam is used with superheated steam input to a cooking chamber, resulting in the cooking chamber filled with oxygen in the air to be in an oxidizing state.

In view of the above, the present invention features upper and lower heaters, in a cooking chamber, reheating superheated steam input to a cooking chamber, so that the superheated steam can be maintained at a high temperature, and also features a small amount of water sprayed into the cooking chamber to turn into steam dispersed in the cooking chamber.

Thus, hydrogen in an active state can effectively work, while the oxygen concentration is relatively dropping in the cooking chamber, to achieve a reducing state in the cooking chamber.

To achieve an even more effective reducing state in the cooking chamber, preferably, a superheated steam generator includes hydrogen water obtained by adding hydrogen to raw water, and the superheated steam supplied into the cooking chamber is at a temperature of 400° C. or higher.

Conventional cookers using superheated steam involve a large-scale boiler, generating water vapor, and a large-scale superheater, superheating the water vapor generated, and thus have been unable to be downsized.

In view of this, the present invention features a superheated steam generator having an integrated structure including a steam generating section provided in a bottom portion of the superheated steam generator and a steam superheater integrally coupled to an upper portion of the steam generating section. Thus, dramatic downsizing can be achieved.

The steam generating section provided in the bottom portion of the superheated steam generator heats water to generate water vapor, and the steam superheater heats the water vapor up to 400° C. or higher to obtain dry steam.

An example of the structure with the steam generating section and the superheater integrated includes a structure in which the superheated steam generator has an approximately L or inversed T shape as a whole, with the steam generating section provided in a bottom portion provided with a heater extending in a lateral direction and the superheating section, provided in the standing portion of the approximately L or inversed T shape, provided with a heater extending in the upper and lower direction.

With this configuration, the steam generated in the bottom portion is superheated to be superheated steam while rising in the standing portion, whereby dramatic downsizing can be achieved.

Food cooked in the cooking chamber with heat emits gas components. Furthermore, gas components are generated due to water sprayed into the cooking chamber or other like factors.

Thus, in the present invention, a purge process section may be provided for deodorizing and discharging gas or the like generated in the cooking chamber, and the purge process section may have a portion to be in contact with flowing water.

The cooker according to the present invention features reduction action on food (food product) cooked with heat and thus has various advantageous effects including: a lower risk of losing nutrients from the food; more sweetness; no fish odor; tender finish; and higher preservation performance.

With the cooking chamber kept at a high temperature of 400° C. or higher, or preferably, 450° C. or higher, cooking can be quickly completed with less heating unevenness.

For example, a frozen meal can be directly put in the cooking chamber to be cooked with heat, without compromising the quality of the meal.

Thus, no pre-thawing of food, which may lead to cooking loss, is required unlike in conventional cases.

With the high-temperature superheated steam surrounding each piece of food, the required cooking time is not dependent on the number of pieces of food and thus does not fluctuate, whereby cooking can be performed with a simple and easy operation.

The reduction action also works in the cooking chamber, so that odor transfer can be prevented. Thus, cooking can be sequentially performed without worrying about unique odor of fish, meat, or the like transferring to subsequent pieces of food. Furthermore, the chamber is less likely to be tainted so as to be easily cleanable.

BRIEF DESCRIPTION OF THE DRAWINGS

FIG. 1A and FIG. 1B are diagrams illustrating a configuration example of a body of a cooker according to the present invention, in which FIG. 1A is a transparent view illustrating an inner portion of a cooking chamber and the like and FIG. 1B is an outer perspective view of the cooker;

DETAILED DESCRIPTION OF THE INVENTION

An example of a configuration of a cooker according to the present invention is described below with reference to the drawings. Note that the present invention is not limited to this example.

Figure 2:
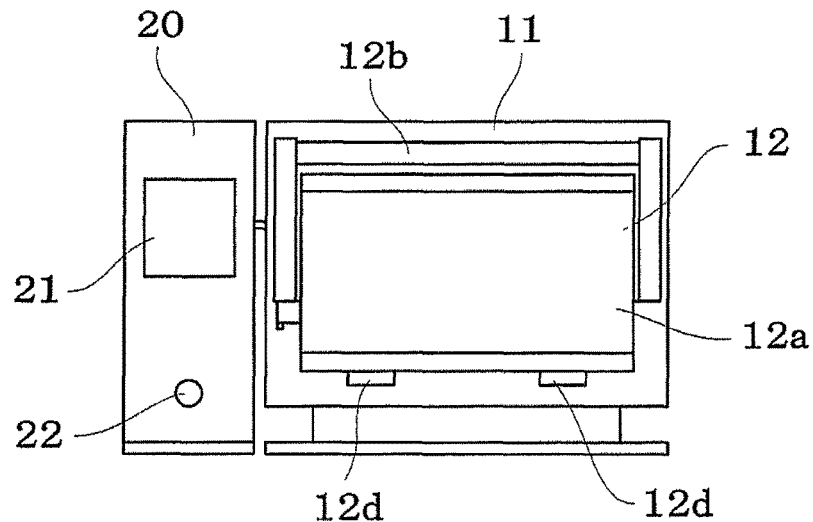
FIG. 2 is a front view of the cooker according to the present invention, illustrating the body including the cooking chamber and a door and a control section for the cooker.

As illustrated in FIG. 2, a cooker 10 includes a body and a control section 20. The body includes a cooking chamber 11 and a door 12.

The control section 20 is provided with a power switch 22 and a display panel 21.

Figure 1A:
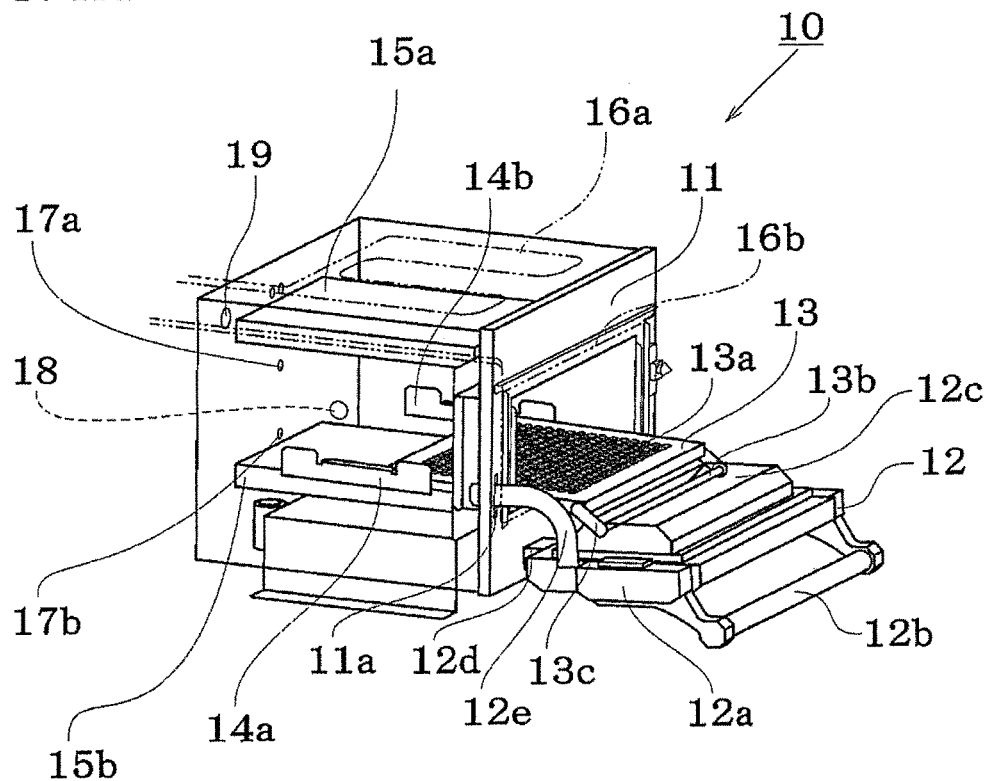
Figure 1B:
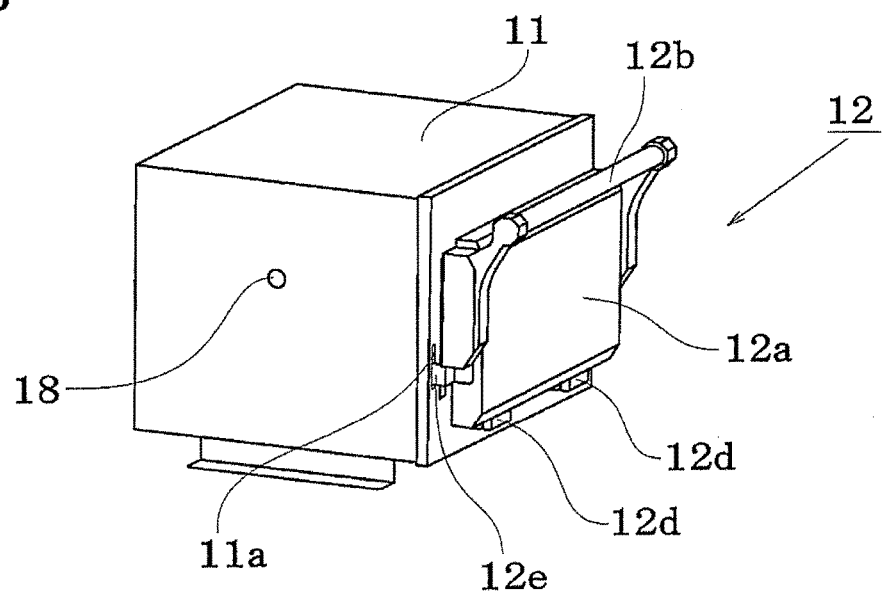

The body is described with reference to FIG. 1A and FIG. 1B.

The door 12 for opening and closing an opening of the cooking chamber 11 has a lower end portion of a door body 12a rotatably coupled via hinges 12d, so that the door 12 can pivot upward and downward.

In the present embodiment, a pair of approximately L-shaped guide arms 12e are attached to both sides of the door body 12a to facilitate a stable opening/closing operation by a user holding a handle 12b. The guide arms 12e rotate along guide holes 11a formed on the cooling chamber.

In the present embodiment, a cooking table 13 having a plate shape extends and retracts through the opening, in accordance with the opening/closing operation of the door 12.

The cooking table 13 is formed as a plate that is made of stainless steel, aluminum, or the like, and is provided with a plurality of through holes 13a. A linking bar 13b is attached to an opening-side end of the cooking table 13 via coupling members 13c.

A guide case 12c with a hollow inner space is attached to an inner side of the door body 12a.

The linking bar 13b is inserted through the hollow inner space of the guide case 12c, and has both end portions coupled to the cooking table 13 via the coupling members 13c. With this configuration, the linking bar 13b moves in an upper and lower direction in the hollow inner space of the guide case 12c, in accordance with the opening/closing operation of the door 12.

Both side portions of the cooking table 13 move along slide guide rails 14a and 14b inside the cooking chamber.

The space inside the cooking chamber 11 is provided with an upper heater 15a and a lower heater 15b, a superheated steam outlet 18 through which superheated steam is input into the cooking chamber 11, and upper and lower shower nozzles 17a and 17b for injecting water.

A cooling tube 16a is arranged around the opening of the cooking chamber 11 and a cooling tube 16b is arranged on the inner side of a top board of the cooker 10.

The cooling tube 16b thus arranged around the opening of the cooking chamber 11 prevents the door 12 from being overheated.

The cooling tube 16a on the inner side of the top board prevents the top board from being overheated.

Figure 3:
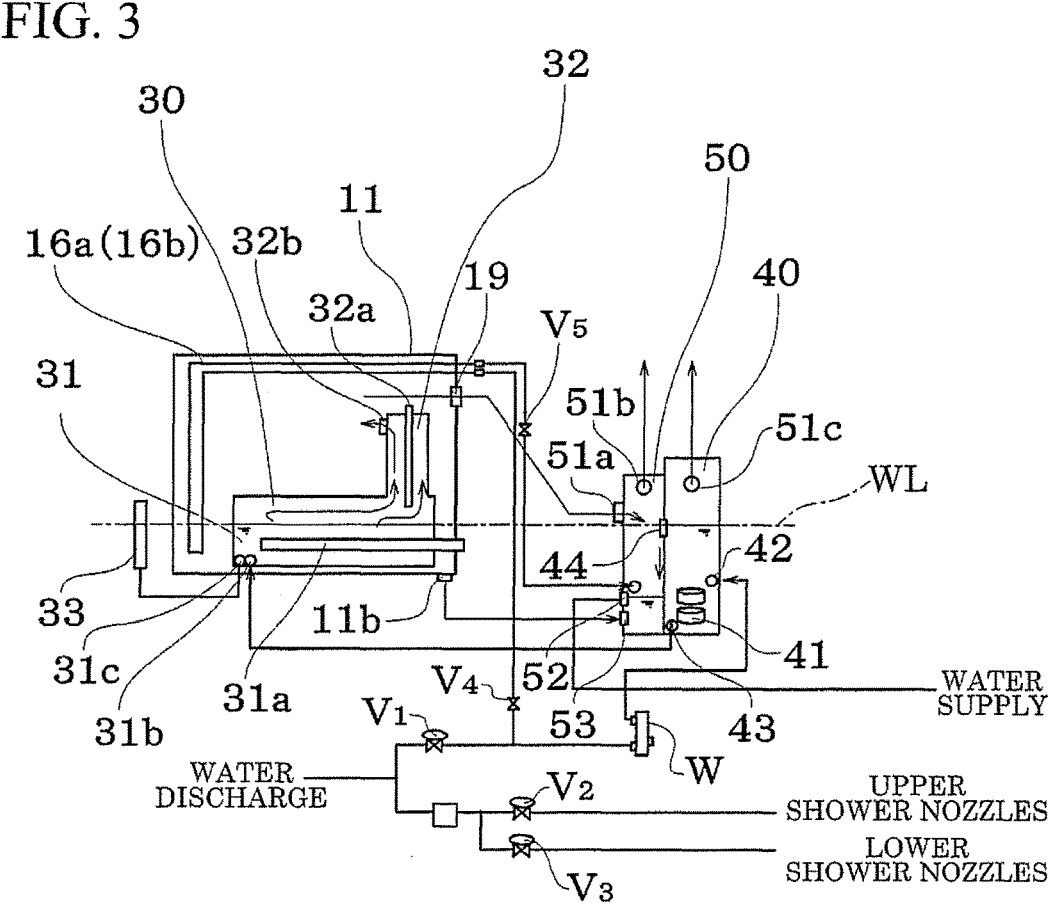
FIG. 3 is a diagram illustrating flows among elements embedded in the control section.

FIG. 3 illustrates positional relationship between the cooking chamber 11 and the superheated steam generator 30 in the control section 20, and also illustrates a hydrogen water generating section 40, a purge process section 50, and flows of water and gas.

The superheated steam generator 30 has a substantially L-shaped structure, with a steam generating section 31 provided in a bottom portion of the L shape. The steam generating section 31 is filled with water up to a predetermined water level WL. A heater 31a extending in a lateral direction is provided on a portion provided with the steam generating section 31. The steam generating section 31 generates steam (water vapor) with the heater 31a heated.

A portion of the L shape standing from the bottom portion serves as a superheating section 32 provided with a heater 32a extending in the upper and lower direction.

With this configuration, the steam generated in the steam generating section 31 on the bottom side is heated while rising along the heater 32a, provided on the standing portion, to be superheated steam.

A discharge port 32b is in communication with the superheated steam outlet 18 of the cooking chamber 11, so that the superheated steam can be discharged into the cooking chamber 11.

As illustrated in FIG. 4A to FIG. 4D, the hydrogen water generating section 40 and the purge process section 50 are integrally formed.

Figure 4A:
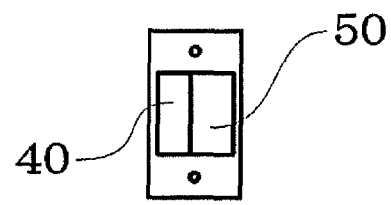
FIG. 4A to FIG. 4D are diagrams illustrating configuration examples of a hydrogen water generating section and a purge process section.
Figure 4B:
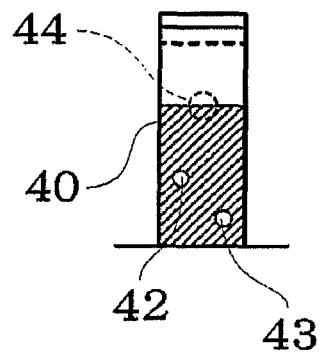
Figure 4C:
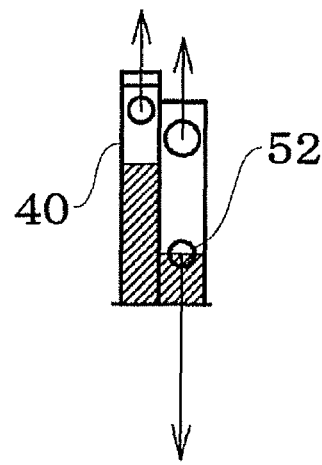

As illustrated in FIG. 3, water is supplied through a water supply port 42 of the hydrogen water generating section 40 via a solenoid valve $V_1$ and a water gauge W (also see FIG. 4B).

Hydrogen generators 41 are installed in the hydrogen water generating section 40. The water turns into hydrogen water upon coming into contact with the hydrogen generators 41.

Hydrogen water may also be generated by electrolysis. However, this requires a large-scale system. Thus, the hydrogen generators 41 such as ceramic are preferably used.

For example, a mineral discovered in Kaga city, Ishikawa prefecture in Japan may be used. This mineral generates hydrogen simply by interacting with water.

This mineral includes 5 to 15% of diatomaceous earth, 30 to 50% of kaolinite, 15 to 25% of bentonite, 15 to 20% of sodium silicate, and 15 to 25% of magnesium.

The hydrogen water generated by the hydrogen water generating section 40 includes 300 to 700 ppb of hydrogen.

The hydrogen water is supplied to the steam generating section 31 through a pipe between the supply port 43 and the water supply port 31b of the steam generating section 31 (see FIG. 3 and FIG. 4B).

A water discharge port 44 open to the purge process section 50 is provided so that the water level WL of the steam generating section 31 is kept constant even when the water is supplied (see FIG. 4B).

A water level gauge 33 is provided so that the water level WL can be checked.

The water level gauge 33 is connected to a communication port 31c of the steam generating section 31.

Water that has flowed out from the water discharge port 44 of the hydrogen water generating section 40 flows down along a partitioning wall between the hydrogen water generating section 40 and the purge process section 50.

A connection port 51a of the purge process section 50 is in communication with a discharge port 19 in the cooking chamber 11 through a pipe. Thus, gas components generated in the cooking chamber 11 flow into the purge process section 50 (see FIG. 3 and FIG. 4D).

The gas components come into contact with flowing water while flowing, whereby the gas components are purged.

The purged gas is discharged to the outside through discharge ports 51b and 51c (see FIG. 3). Meanwhile, discharge liquid is discharged to the outside through a discharge liquid port 52 (see FIG. 3 and FIG. 4C).

Figure 4D:
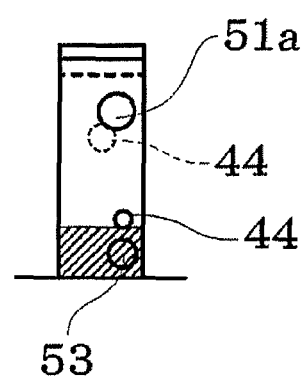

Water or other like liquid accumulated in the bottom portion of the cooking chamber 11 is discharged through a water discharge section 53 from a bottom portion water discharge port 11b (see FIG. 3 and FIG. 4D).

The water supply section as illustrated in FIG. 3 is connected through a pipe to the upper and the lower shower nozzles 17a and 17b in the cooking chamber 11 via solenoid valves $V_2$ and $V_3$. Water is supplied to the cooling tubes 16a and 16b via a solenoid valve $V_4$. Discharge water from the cooling tubes 16a and 16b is discharged through the purge process section 50.

An example of how the cooker 10 according to the present invention is used is described.

A container accommodating food (food product) is placed on the cooking table 13, the door 12 is closed, and the switch 22 is turned ON.

Superheated steam at 450 to 500° C. is discharged from the superheated steam outlet 18. The superheated steam is reheated by the upper and the lower heaters 15a and 15b to be maintained at the high temperature.

The temperature of the heaters 15a and 15b may be adjusted so that the superheated steam is reheated to be at an even higher temperature of 500 to 600° C.

In this process, water is sprayed from the upper and the lower shower nozzles 17a and 17b at a predetermined time interval.

The water sprayed into the high temperature environment immediately turns into steam to be gas filling the cooking chamber 11.

Thus, an oxygen concentration relatively drops, whereby a reducing atmosphere including active hydrogen can be achieved.

The display section 21 displays a sign or message indicating that cooking is in progress. A display on a panel or a sound from a buzzer notifies the completion of the cooking.

In the cooker 10, a potato was fully cooked with the heat-based cooking in about three to five minutes.

Next, fish, saury, was broiled in the cooker 10 in about five to eight minutes.

The broiled "saury" had a "crispy" surface free of moisture, and had less fishy odor than as if it was grilled.

No fish odor or other like malodor was left in the cooking chamber 11.

Next, a beef steak was cooked with the heat-based cooking for about 5 to 15 minutes.

Usually, a piece of beef slightly shrinks when grilled on an iron plate or the like. On the other hand, in the cooker 10 according to the present invention, the beef was grilled in the reducing state with an appropriate amount of water vapor, and thus was able to be grilled with no size change.

The beef was free of fish odor from the fish, which was just cooked.

The grilled beef stayed tender for days, proving excellent preservation performance.

The cooker according to the present invention has a simple and compact structure and thus supports both professional and household applications, and can be used for cooking various types of food.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A cooker comprising:
    a cooking chamber having an opening;
    a door opening and closing the opening;
    heaters provided in an upper portion and a lower portion of the cooking chamber;
    a superheated steam generator supplying superheated steam into the cooking chamber,
    the superheated steam generator including hydrogen water obtained by adding hydrogen to raw water, and the superheated steam supplied into the cooking chamber being at a temperature of 400° C. or higher; and
    a water spraying section spraying water into the cooking chamber,
    a reducing state being established in the cooking chamber.

2. The cooker as defined in claim 1,
    the superheated steam generator having an integrated structure including a steam generating section provided in a bottom portion of the superheated steam generator and a steam superheater integrally coupled to an upper portion of the steam generating section.

3. A cooker comprising:
    a cooking chamber having an opening;
    a door opening and closing the opening;
    heaters provided in an upper portion and a lower portion of the cooking chamber;
    a superheated steam generator supplying superheated steam into the cooking chamber;
    a water spraying section spraying water into the cooking chamber,
    a reducing state being established in the cooking chamber; and
    a purge process section deodorizing and discharging gas generated in the cooking chamber,
    the purge process section having a portion to be in contact with flowing water.

* * * * *